United States Patent
Burch et al.

(10) Patent No.: US 9,917,832 B2
(45) Date of Patent: *Mar. 13, 2018

(54) REMOTE KEYCHAIN FOR MOBILE DEVICES

(71) Applicant: NetIQ Corporation, Provo, UT (US)

(72) Inventors: Lloyd Leon Burch, Payson, UT (US); Michael F. Angelo, Spring, TX (US); Baha Masoud, Orem, UT (US)

(73) Assignee: NetIQ Corporation, Provo, UT (US)

( * ) Notice: Subject to any disclaimer, the term of this patent is extended or adjusted under 35 U.S.C. 154(b) by 162 days.

This patent is subject to a terminal disclaimer.

(21) Appl. No.: 14/526,243

(22) Filed: Oct. 28, 2014

(65) Prior Publication Data

US 2015/0121498 A1  Apr. 30, 2015

Related U.S. Application Data

(63) Continuation of application No. 13/755,943, filed on Jan. 31, 2013, now Pat. No. 8,904,504.

(51) Int. Cl.
| | |
|---|---|
| *H04L 29/06* | (2006.01) |
| *H04W 12/04* | (2009.01) |
| *H04W 4/00* | (2018.01) |
| *H04W 12/06* | (2009.01) |

(52) U.S. Cl.
CPC .......... *H04L 63/0853* (2013.01); *H04L 63/08* (2013.01); *H04W 12/04* (2013.01); *H04L 63/062* (2013.01); *H04L 63/0815* (2013.01); *H04W 4/003* (2013.01); *H04W 12/06* (2013.01)

(58) Field of Classification Search
CPC ... H04L 63/08; H04L 63/0853; H04L 63/062; H04L 63/0815; H04W 12/04; H04W 12/06; H04W 12/003
See application file for complete search history.

(56) References Cited

U.S. PATENT DOCUMENTS

| | | | |
|---|---|---|---|
| 6,980,989 B2 | 12/2005 | Silverman et al. | |
| 7,412,447 B2 | 8/2008 | Hilbert et al. | |
| 8,281,135 B2 | 10/2012 | Smith | |
| 8,977,854 B2* | 3/2015 | Lee | H04L 51/04 709/206 |
| 2006/0015358 A1* | 1/2006 | Chua | G06Q 20/02 705/44 |
| 2007/0094503 A1* | 4/2007 | Ramakrishna | H04L 9/0822 713/172 |
| 2010/0023776 A1 | 1/2010 | Fedronic et al. | |
| 2011/0099612 A1* | 4/2011 | Lee | H04L 51/04 726/6 |
| 2011/0209208 A1* | 8/2011 | Quach | H04L 9/3215 726/7 |

(Continued)

*Primary Examiner* — Beemnet Dada
(74) *Attorney, Agent, or Firm* — Schwegman Lundberg & Woessner, P.A.

(57) ABSTRACT

An app of a mobile device registers the mobile device for a remote credential server (RCS) and receives a device token. When a credential for a remote asset is supplied on the mobile device it is routed to the RCS and stored external to the mobile device but referenced on the mobile device via an asset token. When the credential is needed, the device token and the asset token permit the RCS to authenticate and return the credential to or on behalf of the mobile device so that the mobile device can authenticate to and access the remote asset.

10 Claims, 7 Drawing Sheets

(56) References Cited

U.S. PATENT DOCUMENTS

| | | |
|---|---|---|
| 2012/0087493 A1 | 4/2012 | Chidambaram et al. |
| 2012/0276872 A1* | 11/2012 | Knauth .................. H04L 63/18 455/411 |
| 2013/0167250 A1 | 6/2013 | Balasubramanian |
| 2013/0318593 A1 | 11/2013 | Smith et al. |
| 2014/0075513 A1 | 3/2014 | Trammel et al. |
| 2014/0095692 A1 | 4/2014 | Anderson et al. |
| 2014/0215587 A1 | 7/2014 | Burch et al. |

* cited by examiner

REMOTE KEYCHAIN FOR MOBILE DEVICES

This application is a continuation of U.S. patent application Ser. No. 13/755,943, filed on Jan. 31, 2013, which is incorporated herein by reference in its entirety.

BACKGROUND

As the industry increases the use of mobile devices, there is a problem when users work in a mixed environment of desktop machines and mobile devices.

Beyond interface issues associated with the smaller device screens of mobile devices, enterprises face a plethora of security related issues when allowing these mobile devices to access enterprise assets. Yet, there is a tremendous need for allowing access to assets via mobile devices since this is the manner in which people work and communicate nowadays and since the growth of mobile usage has been exponential in recent years.

Consider the security issue associated with the corporate credentials or secrets, such as name and passwords, which can be stored on a user's mobile device. Various vendors, such as Apple® have tried to make this safer by providing a "keychain." The keychain provides a place where credentials can be encrypted on the device for safer storage. The problem is that the credentials are still stored on the device, and if the device is lost or stolen, the corporate credentials can be discovered and exposed. The amount of work to get the credentials varies greatly depending on the device state. Some examples of a device state can be suspension or hibernation. In addition access to the credentials might depend on if they were ever cached in memory. In either case, if a device is lost the user or administrator must change all corporate passwords that were stored on the lost device. This is further compounded as the user may not realize the device is lost and or be able to signal the system that they lost his/her device. Once the loss of the device is discovered the user or administrator has no way to know if the secrets have been discovered.

In addition, storing the password on the device means it must be sent from the mobile device to a backend enterprise service. This adds a risk that the password may be discovered while it is being sent and is exposed on a network.

Lastly, Apple® mobile devices that use iOS, separate keychains on the device for each application and are not shared. This means that if more than one application needs the same credentials they must be entered and stored once for each application. This introduces the possibility of transcription errors as well as exposure to the passwords.

As stated above and for other reasons, security is an issue of import when enterprises attempt to integrate mobile device access to enterprise assets.

SUMMARY

Various embodiments of the invention provide techniques for remoting a keychain of a mobile device. In an embodiment, a method for remoting a mobile device keychain is presented.

Specifically, a device token is requested from a remote server and the device token is returned in response to that request. Next, the device token is passed to a keychain application for storage in a keychain. Then, a reference identifier and a credential are sent to the remote server with the device token and in response an asset token linked to the credential and reference identifier are acquired. Finally, the keychain application is instructed to store the asset token and the reference identifier in the keychain. In retrieving the credential, the device token, the asset token and the reference identifier are sent to the remote server and the remote server returns the credential for use with authenticating and access a remote asset.

DETAILED DESCRIPTION

Figure 1A:
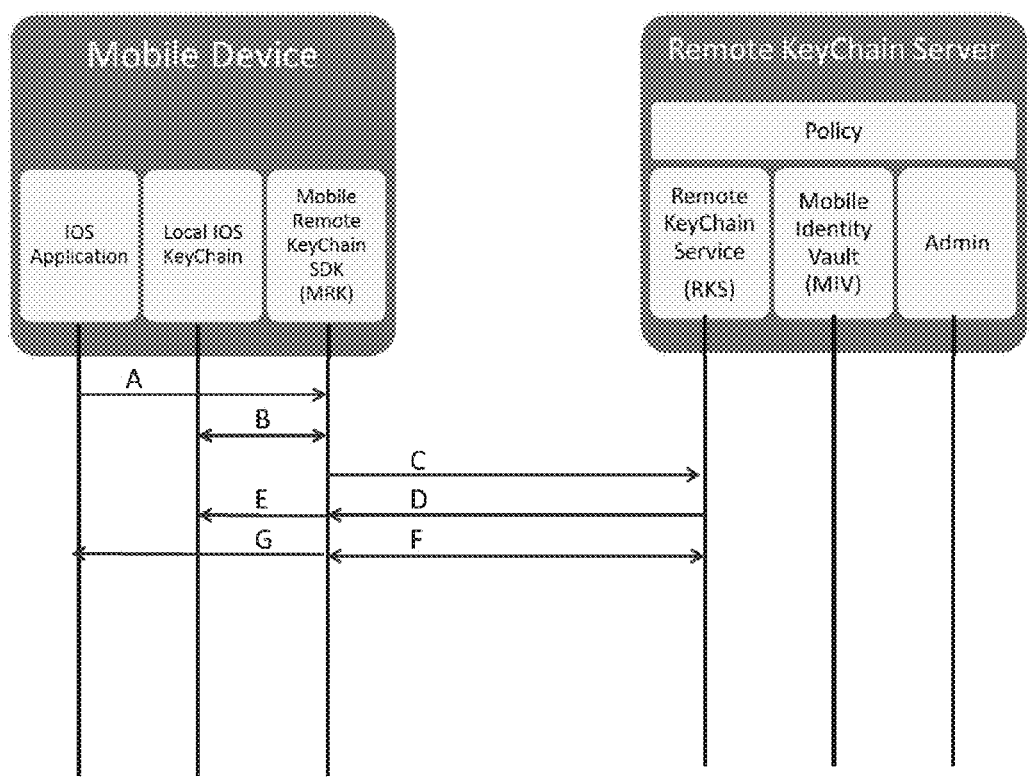
FIGS. 1A-1D are flow diagrams depicting different aspects for remoting a keychain from a mobile device, according to an example embodiment presented herein.

A "resource" includes a user, service, system, device, directory, data store, groups of users, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1A-1D and 2-4.

FIGS. 1A-1D are flow diagrams depicting different aspects for remoting a keychain from a mobile device, according to an example embodiment presented herein. The FIGS. 1A-1D depict a mobile device having iOS as its operating system (OS); this is shown for purposes of illustration and it is noted that the embodiments of the invention are not specifically tied to any specific OS; so, Windows, Android, Linux, Blackberry and other OS's can be used.

The techniques herein allow credentials used for accessing remote network resources (such as enterprise systems and/or assets) to be accessible in an automated manner from a mobile device of a user (may also be referred to as a principal). The credentials are not stored on the mobile device but rather remotely stored and secured external to the mobile device. As stated above, this plugs a security hole associated with providing access to assets via a mobile device.

A "mobile device" can refer to a smartphone, a tablet, a laptop, or any other device that is capable of wireless communications and includes one or more processors with memory and/or storage.

The techniques herein improve on the current state of the industry by enhancing mobile processing to provide additional functionality in the form of a "Mobile Identity Vault" (MIV) and a "Mobile Remote KeyChain" (MRK) Software Development Kit (SDK). While expanding on current mobile functionality, the techniques also expand a local mobile device's keychain (such as iOS), to allow application writers (software developers) to use a similar SDK (call structure) to store credentials on a remote "Identity Vault." In the examples of the FIGS. 1A-1D, the SDK provides the same call structure as the iOS KeyChain SDK with a few enhancements. Generally, the IOS KeyChain SDK provides the ability to add, delete, read and modify items in a keychain for applications. Each item can have attributes, which describe the item, and secret data that is encrypted and stored in the KeyChain. Under iOS the secret data can only be read by the application on the device that wrote it. However, with the embodiments herein the secret is stored remotely, away from the device, with a goal of protecting the secret against a lost or compromised device. The secret is stored on a server and the server provides back a token, which goes into the keychain on the mobile device. The token can later be used to retrieve the secret from the remote source. This token can also be used by other applications, if policy allows, accessing the secret. Each time a secret is retrieved from the MIV an audit event is created; this provides detection of secrets being used after the loss of a mobile device.

Reference is now made to the processing interactions discussed between a mobile device and a remote keychain server, as shown in the FIG. 1A.

The iOS Application makes a request to initialize the Mobile Remote KeyChain (MRK) SDK via (A). The MRK makes a call to get a "DeviceOrServiceToken" (DOST) from the local KeyChain via (B) but there is no valid DOST as of yet. So, the MRK prompts for a valid credential, such as a name and password, this maybe the credentials of the end user or some other person assigned to setup mobile devices. The MRK calls the "Remote KeyChain Service" (RKS) with a request for a DOST and the credentials via (C). The policy of the MRK validates credentials and policy. If allowed, the RKS sends a valid DOST to the MRK via (D). The DOST is now stored in the Local iOS KeyChain via (E). The MRK then uses the DOST to complete the original request of the application via (F). This is described in greater detail herein and below. Credentials that are used are removed from the device and the MRK returns to the iOS Application via (G).

The techniques provide a same functionality as the iOS KeyChain SDK does but uses the Mobile Remote KeyChain to store the attributes without storing the secret data on the mobile device. In the secret data's place, a "SecetDataAccessToken" (SDAT) is stored, in the mobile KeyChain, which is used by a remote server to access the secret data. The "SDAT is used to get the secret data, the requestor (user or principal) must also have a DOST that is authorized to retrieve the secret data.

Figure 1B:
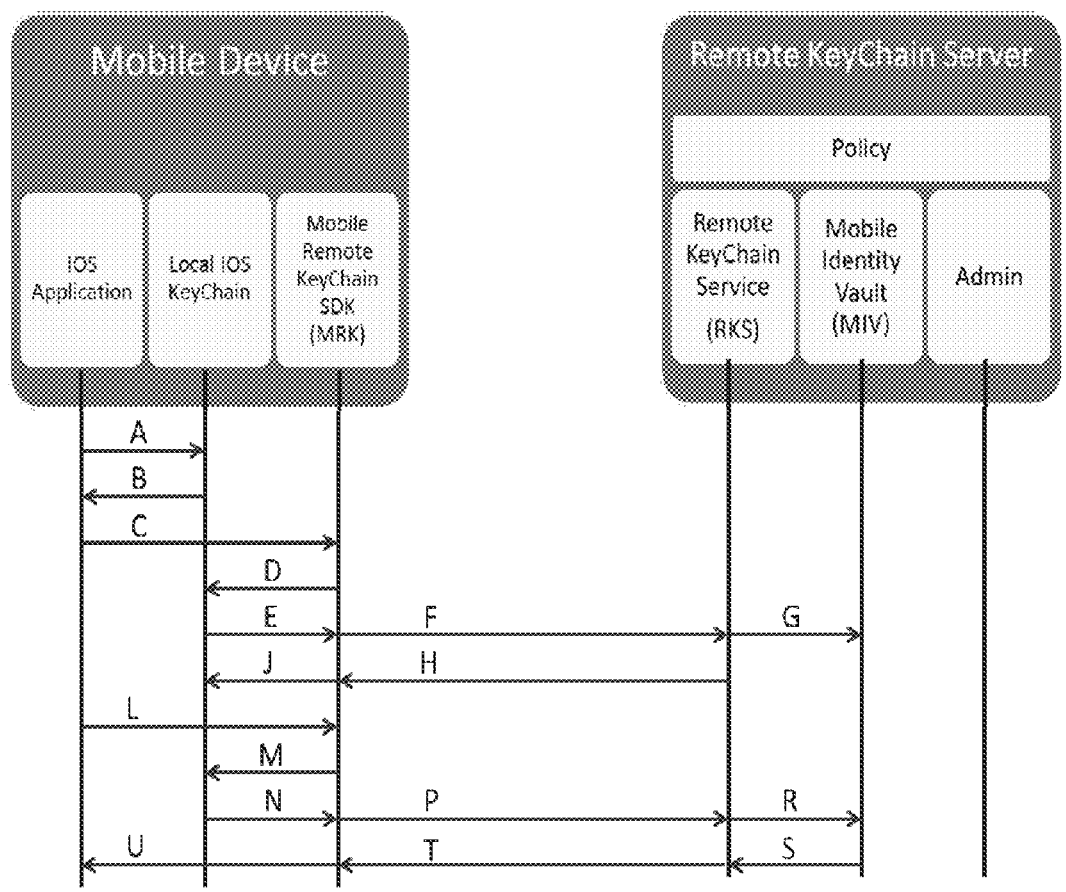

The FIG. 1B is a flow diagram that shows how a mobile device obtains a credential, such as a name and password for the user, and stores, and retrieves the credential using techniques presented herein. This process flow uses Apple iOS as an example, but the invention is not limited to iOS; again iOS is used for purposes of illustration and comprehension with the examples provided in the FIGS. 1A-1D.

For context, a normal flow of an iOS application using the iOS KeyChain is initially discussed. The application prompts a user for a Name and Password and if they are correct, the application calls the iOS SDK and stores the information in the keychain via (A) with a reference ID. The next time the user needs to login, the application requests the password from the keychain SDK with the reference ID, and it is returned to the application via (B). The password is protected such that only the iOS application, on the mobile device, that wrote it is allowed to read it.

With the techniques herein, the flow and SDK calls, from the view of the application, are similar. The application prompts the user for a Name and Password and if they are correct, the application calls the Mobile Remote KeyChain (MRK) SDK, with reference ID, to store the information via (C).

The processing changes and traditional processing enhanced by the MRK reading the DOST from the local KeyChain via (D) and receiving the DOST via (E). The MRK now sends the name, password and reference ID via (F) to the Remote KeyChain Service (RKS) using the DOST as an authorization token. This example can use the OAuth (Open Standards for Authentication) protocol. The RKS validates the DOST and identifies the user and the device. The RKS now uses policy to determine the rights of the device and user. If allowed, the name, password and reference ID are written to the identity vault via (G). The RKS now builds an SDAT that allows access to the name and password just stored in the identity vault. This SDAT is sent back to the MRK via (H). The SDAT and reference ID is now stored in the Local iOS Key Chain. From the view of the application the steps (C-J) are the same as step (A).

When the mobile application needs to retrieve the name and password stored using the MRK, it makes an SDK call to the MRK using the reference ID used to store it via (L).

The reference ID can be a single value or made up of multiple attributes that identify the secret. The MRK now uses the reference ID to read the local iOS keychain via (M) and retrieves the SDAT and the DOST from the iOS keychain via (N). The DOST, SDAT and reference ID are sent to the RKS via (P). The RKS now uses policy to determine the rights of the device and user. If allowed, the name, password pointed to by the reference ID are requested from the identity vault via (R) and returned via (S). The RKS sends the password via (T) to the MRK. The MRK now returns that name and password to the iOS application via (U). These steps (L-U), from the view of the application, are the same as step (B).

As an option, the MRK can also generate a secret, which can be stored in the Local iOS KeyChain, and used to encrypt the secret before it is sent to the RKS. The secret can be linked to the DOST and/or the SDAT. This means that the data stored in the Mobile Identity Vault (MIV) cannot be used without the Local KeyChain on the mobile device. This feature limits the "share" function described herein and below.

Figure 1C:
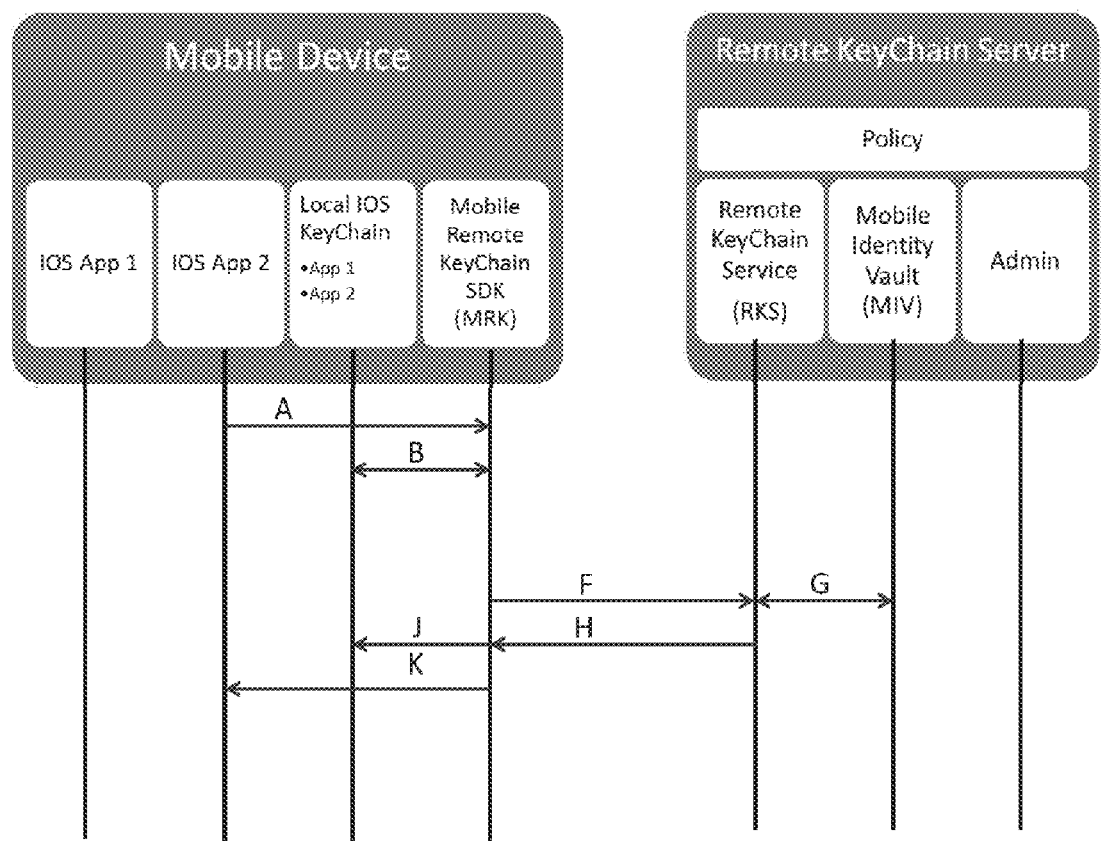

The FIG. 1C is an example of how the embodiments of the invention can be used to share secrets between applications on an iOS device. Currently, iOS does NOT allow applications from different vendors to share KeyChain secrets. So, techniques herein allow policy on a remote server to enable such a feature on an iOS device.

The iOS Application 1 stores a secret, with a reference ID of XYZ, using the MRK (the same as shown in the above example) "SecretWriteandRead," steps (C-J). Application 1 passes the SDAT for the XYZ secret to Application 2. This can be done as Application 1 launches Application 2. (This is not show in the FIG. 1C.) Application 2 makes a request to the MRK asking for a secret with a reference ID of XYZ using the SDAT it received from Application 1, via (A). The MRK requests and gets its DOST from its Local IOS KeyChain via (B). Each application has its own DOST saved in its own KeyChain. All applications on the iOS have their own KeyChain. The MRK now makes a request to the RKS asking the secret of the XYZ secret, using its DOST and the SDAT received from Application 1, via (F). The MRK now validates policy, to verify that Application 2 is allowed to use a SDAT from Application 1, and if allowed the RKS retrieves the secret via (G). The RKS now sends the secret to the MRK via (H) and then the SDAT may be stored in the Local KeyChain for Application 2 to use later, via (J). The RKS then sends the XYZ secret to Application 2 via (K).

Figure 1D:
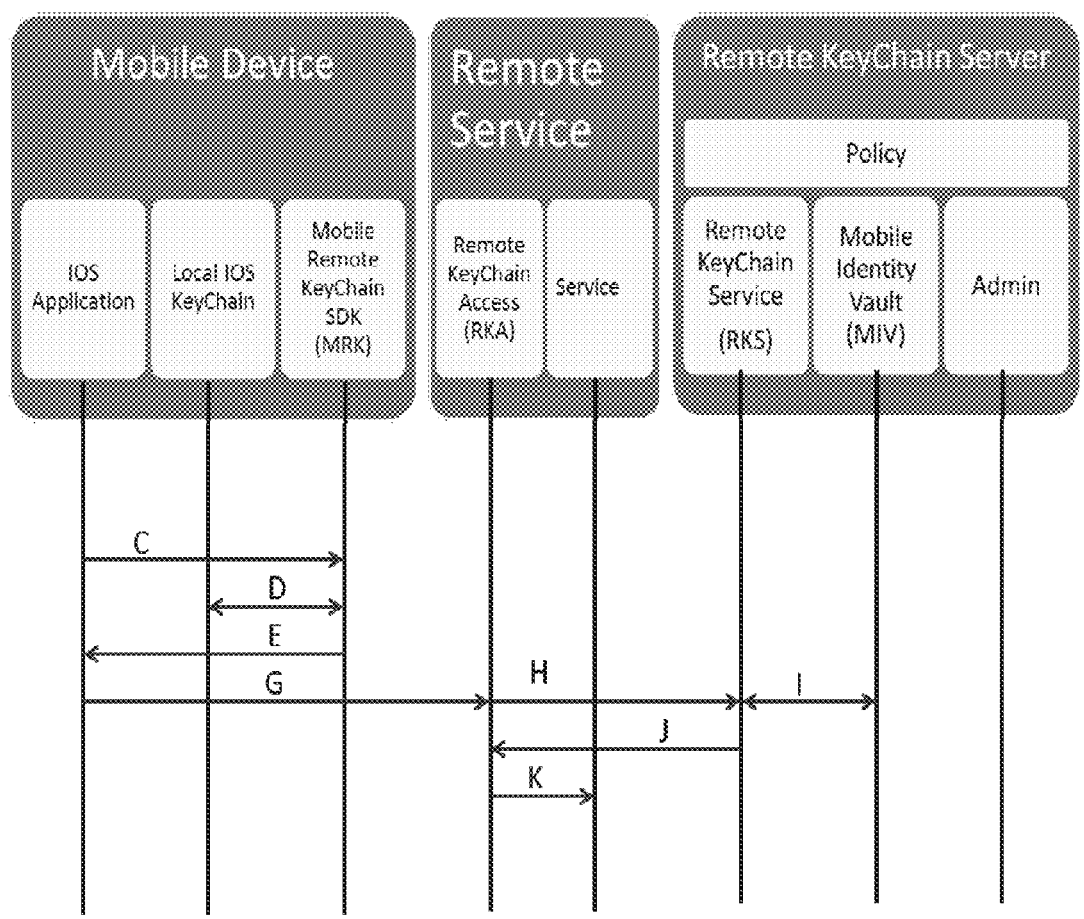

The FIG. 1D is an example of how the techniques herein can be used to share secrets between a mobile application on an iOS device and a backend service. This allows a remote service to use corporate credentials without sending them over the network wire or storing them on the mobile device.

The iOS Application 1 stores a secret, with a reference ID of XYZ, using the MRK (the same as shown in above example) "SecretWriteandRead," steps (C-J). (This is not shown in this flow diagram.) The Application makes a request to the MRK for a SDAT via (C). (NOTE this is not a secret, but rather a SDAT.) The MRK requests and gets the SDAT via (D). The MRK returns the SDAT to the Application via (E). The Application now sends the SDAT as part of a normal request to the Remote Service via (G). The SDAT can be sent as a Hyper Text Transfer Protocol (HTTP) Cookie, Header, or other means. The Remote KeyChain Access (RKA), in this example, is acting as a proxy, protecting the service. The RKA can also be an SDK included in the service. The RKA has its own DOST and sends it and the SDAT it just received to the RKS via (H).

The RKS validates the DOST and the SDAT and then verifies that policy allows the Remote Service to use the SDAT from the Client. If all is allowed the RKS retrieves the XYZ secret from the Identity Vault via (I) and then sends it to the RKA via (J). The RKA uses the secret by injecting the XYZ secrets in the data stream to the Service via (K). The secret can be injected in many ways such as the author's header, form fill in, or other headers.

As will become more apparent to one of ordinary skill in the art, the techniques herein: 1) keep secrets off of the mobile device by storing them on a corporate/secure remote server; 2) allows secrets to be shared between apps on devices that do not allow sharing of secrets between applications, such as iOS devices; 3) allows secrets to be shared with services at the corporation (this prevents secrets from being stored on the mobile device or sent over the Internet from the mobile device for each access); 4) may include additional keys used to decrypt the secret (this prevents secrets from being discovered on the server—to gain access to the secret, BOTH the mobile device token, mobile key and data on the sever are required); 5) allows the device to send a token that may be used by other apps for services to obtain secrets; 6) controls all of the above features by policy stored on the corporate/secure remote servers (this allows control of the corporate secrets); 7) allows audits of all use, or attempted use, of the secrets used by services and/or application; 8) allows the detection of secrets used after the loss of the mobile device; and/or 9) allows all secrets to be disabled or destroyed by a user or an administrator, without access to the mobile device. Lost, stolen or misused devices can have the tokens to secrets rendered useless without recovering the device.

Figure 2:
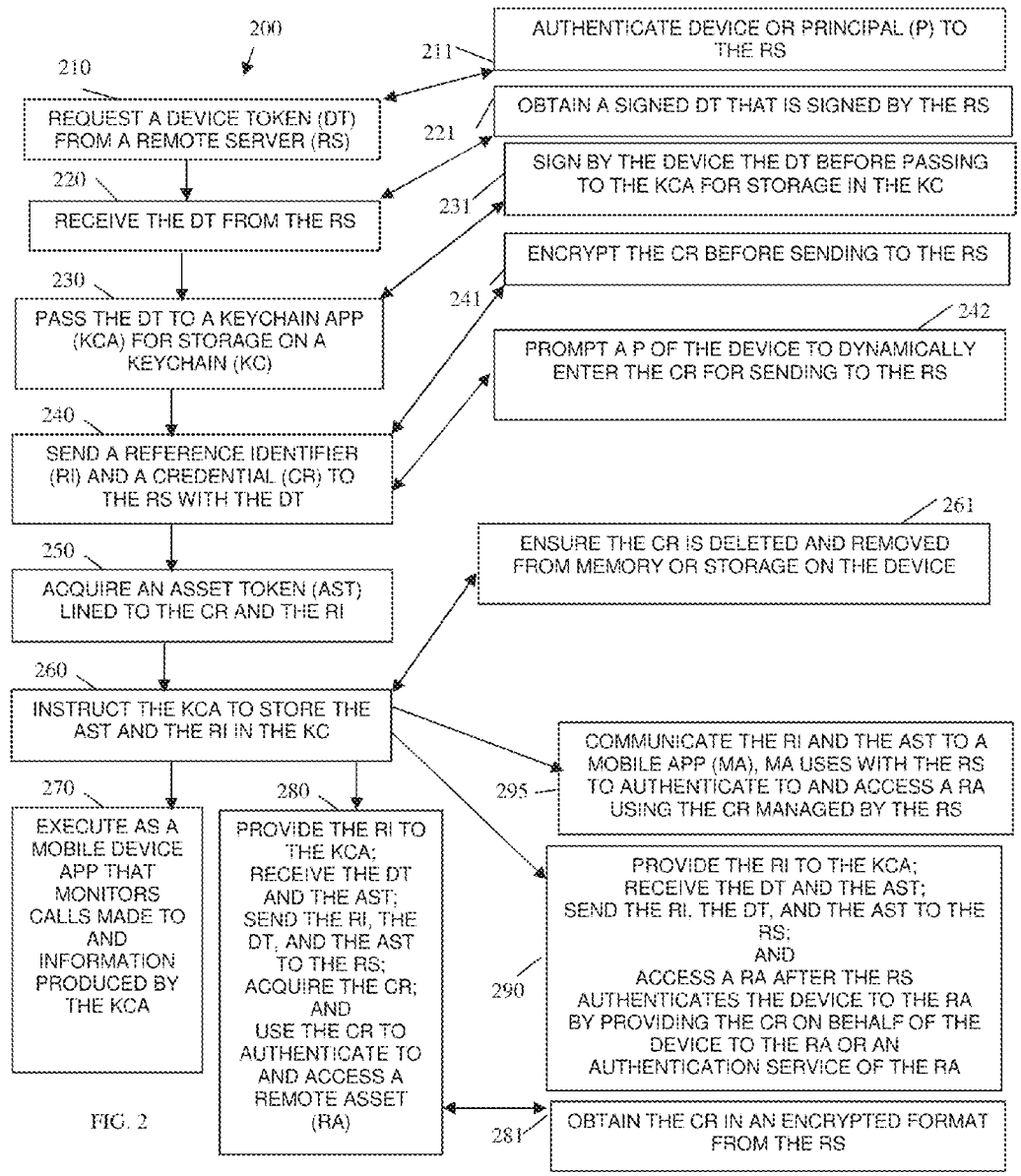
FIG. 2 is a diagram of a method for remoting a mobile device's keychain, according to an example embodiment presented herein.

FIG. 2 is a diagram of a method 200 for remoting a mobile device's keychain, according to an example embodiment presented herein. The method 200 (herein after referred to as "mobile device credential manager") is implemented, programmed, and resides within memory and/or a non-transitory machine-readable storage medium that executes on one or more processors of a device and is operational over a network. The network may be wired, wireless, or a combination of wired and wireless.

The mobile device credential manager provides the processing perspective of an agent that processes as an app or service on a mobile device (phone, tablet, etc.). The mobile device credential manager interacts with a remote secure server service (described below with reference to the FIG. 3).

At 210, the mobile device credential manager requests a device token from a remote server. Examples of the remote server were presented above in the FIGS. 1A-1D and are further presented below with reference to the FIGS. 3 and 4. The request can occur indirectly when a principal (automated application or a user) attempts to access a remote asset (resource) via a keychain or authentication module on the mobile device that is processing the mobile device credential manager. Here, the keychain is detected as lacking a device token and the mobile device credential manager makes a request to the remote server on behalf of the mobile device for the device token.

According to an embodiment, at 211, the mobile device credential manager authenticates the mobile device processing the mobile device credential manager and/or the principal (automated application or user) to the remote server.

At 220, the mobile device credential manager receives the device token back from the remote server. The device token provides a mechanism for the remote server to authenticate or partially authenticate the mobile device and/or the principal.

In an embodiment, at 221, the mobile device credential manager obtains a signed device token, signed by the remote server. For added security, the device token's signature can be verified by the mobile device credential manager before being relied upon and used with a keychain application.

At 230, the mobile device credential manager passes the device token to a keychain application for storage in a keychain. It is noted that the existing SDK or Application Programming Interface (API) for the keychain application that processes on the mobile device can be used and the keychain application does not have to be modified to integrate with the mobile device credential manager in the manners discussed herein.

According to an embodiment, at 231, the mobile device credential manager signs (via the mobile device credential manager or the mobile device that processes the mobile device credential manager) the device token before the device token is passed to the keychain application for storage in the keychain.

At 240, the mobile device credential manager sends a reference identifier and a credential to the remote server with the device token. The reference identifier referring to a remote access (remote resource). The credential is one or more sets of information used to authenticate either to or through a front-end authentication service of the remote asset.

In an embodiment, at 241, the mobile device credential manager encrypts the credential before sending to the remote server over a network connection. This can ensure greater security for the credential. Moreover, the connection between the mobile device and the remote server can itself be achieved via a secure connection.

In another case, at 242, the mobile device credential manager prompts a principal of the device to dynamically enter the credential for sending to the remote sever. So, the credential is never stored on the mobile device; although it may temporarily exists in memory on the mobile device. In some cases, the principal may provide a reference to a third-party identity service that can supply the credential on behalf of the principal. In this latter case, the principal never actually enters and transmits the credential from the mobile device.

At 250, the mobile device credential manager acquires an asset token linked to the credential and reference identifier. The asset token provides a mapping at the remote server between the remote asset (via the reference identifier) and the credential. The credential is not retained on the mobile device; rather it is retained and managed on the remote server.

At 260, the mobile device credential manager instructs the keychain application (via a SDK or API of the keychain application) to store the asset token and the reference identifier in the keychain.

According to an embodiment, at 261, the mobile device credential manager ensures the credential is deleted and removed from memory and storage on the device. This ensures that the credential is not accessible directly on the mobile device. So, should the mobile device become stolen or lost there is little danger that access to the remote asset can be compromised and if compromised the damage can be restricted by revoking the device token at the remote server.

In an embodiment, at 270, the mobile device credential manager executes as a mobile device app that monitors calls made to and information produced from the keychain application. In this way, and as stated above, the keychain application does not have to be changed to interact with the mobile device credential manager. In fact, the mobile app, which is the mobile device credential manager, can be acquired initially via an app store and dynamically downloaded and installed on the mobile device.

In another scenario, at 280, the mobile device credential manager provides the reference identifier to the keychain application. Next, the mobile device credential manager receives the device token and the asset token back from the keychain application. Then, the mobile device credential manager sends the reference identifier, the device token, and the asset token to the remote server wherein in response thereto the credential is received back from the remote server. Finally, the mobile device credential manager uses the credential to authenticate to and access a remote asset.

Continuing with the embodiment of 280 and at 281, the mobile device credential manager obtains the credential in an encrypted format from the remote server.

In another case, at 290, the mobile device credential manager provides the reference identifier to the keychain application and in response thereto the device token and asset token are returned by the keychain application. Next, the mobile device credential manager sends the reference identifier, the device token, and the asset token to the remote server. (Up until this point the processing at 290 is similar to that which was described above at 280.) Finally, the mobile device credential manager accesses the remote asset after the remote server authenticates the mobile device to the remote asset by providing the credential on behalf of the mobile device to the remote asset or an authentication service of the remote asset. This was discussed above with reference to the FIG. 1D.

According to an embodiment, at 295, the mobile device credential manager communicates the reference identifier and the asset token to a mobile app that the mobile app can use with the remote server to authenticate to and access a remote asset using the credential managed by the remote server. This permits a credential to be shared across different keychains for different applications and perhaps even different mobile devices. This situation was discussed above with reference to the FIG. 1C.

Figure 3:
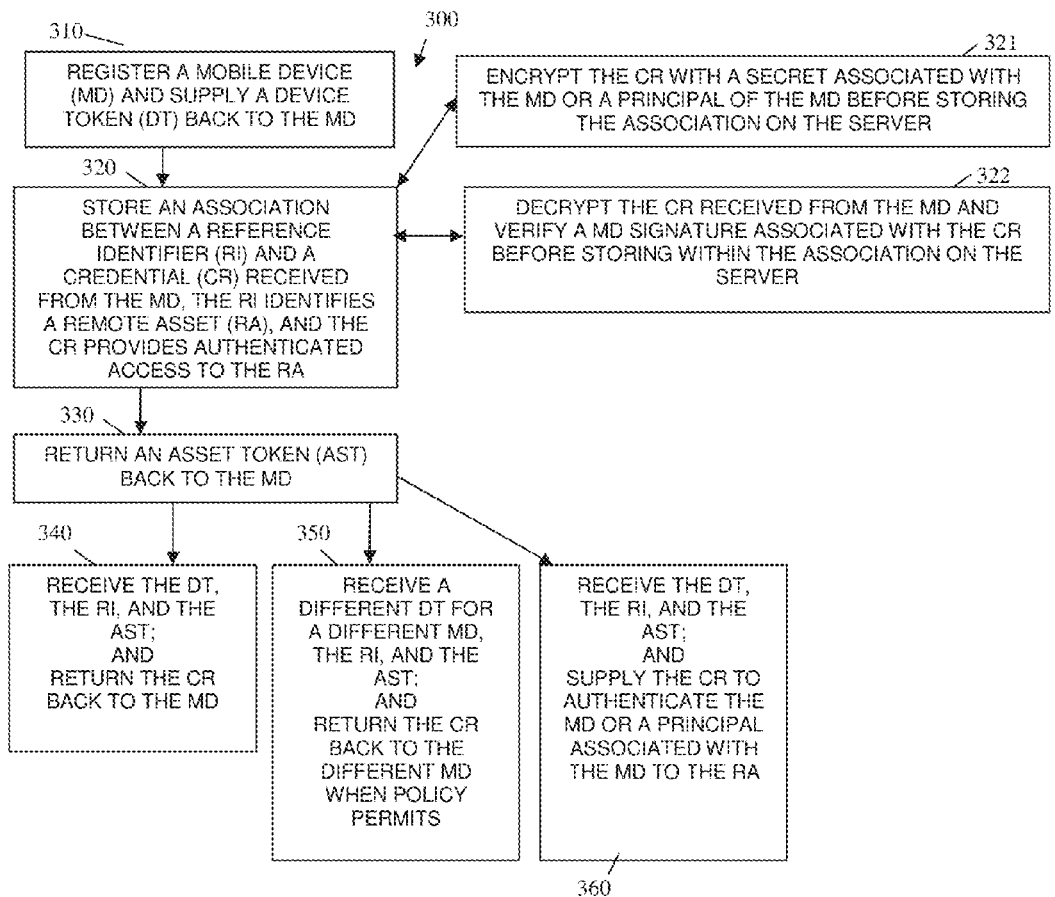
FIG. 3 is a diagram of another method for remoting a mobile device's keychain, according to an example embodiment.

FIG. 3 is a diagram of another method 300 for remoting a mobile device's keychain, according to an example embodiment. The method 300 (herein after referred to as "server credential manager") is implemented, programmed, and resides within memory and/or a non-transitory machine-readable storage medium that executes on one or more processors of a server and is operational over a network. The network may be wired, wireless, or a combination of wired and wireless.

The server credential manager is presented from the perspective of a remote secure server device or cloud processing environment that interacts with clients, via the mobile device credential manager (discussed above with reference to the FIG. 2).

At 310, the server credential manager registers a mobile device and supplies a device token to the mobile device to subsequently identifier and perhaps authenticate the mobile device.

At 320, the server credential manager stores an association (relation or relationship) between a reference identifier and a credential received from the mobile device. The reference identifier identifies a remote asset and the credential provides authenticated access to the remote asset.

According to an embodiment, at 321, the server credential manager encrypts the credential with a secret associated with the mobile device or a principal of the mobile device before storing within the association on the server.

In another situation, at 322, the server credential manager decrypts the credential received from the mobile device and verifies a mobile device signature associated with the credential before storing within the association on the server.

At 330, the server credential manager returns an asset token back to the mobile device. As discussed in detail herein and above, the asset token is used on the mobile device within a keychain application or authentication manager to remotely reference via the server credential manager the credential needed to access the remote asset.

According to an embodiment, at 340, the server credential manager receives the device token, the reference identifier, and the asset token from a mobile device app on a mobile device (such as the one discussed above with reference to the method 200 of the FIG. 2). Then, the server credential manager returns the credential back to the mobile device, via the mobile device app. The mobile device can then use the credential to authenticate to and access the remote asset.

In one situation, at 350, the server credential manager receives a different device token for a different mobile device, the reference identifier, and the asset token. Then, the server credential manager returns the credential back to the different mobile device when policy permits. This situation was discussed above with reference to the FIG. 1C and permits credential sharing across mobile devices and/or mobile device applications (essentially keychain sharing in some instances).

In an embodiment, at 360, the server credential manager receives the device token, the resource identifier, and the asset token. Then, the server credential manager supplies the credential to authenticate the mobile device or a principal associated with the mobile device to the remote asset. This situation was referred to above with reference to the FIG. 1D.

Figure 4:
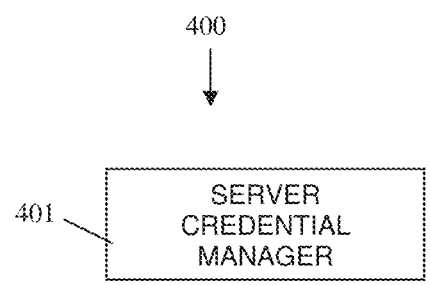
FIG. 4 is a diagram of a keychain remoting system, according to an embodiment.

FIG. 4 is a diagram of a keychain remoting system 400, according to an embodiment. The components of the keychain remoting system 400 are implemented as executable instructions that reside within memory and/or non-transitory computer-readable storage media and those instructions are executed by one or more devices. The components and the devices operational over a network and the network can be wired, wireless, or a combination of wired and wireless.

According to an embodiment, the keychain remoting system 400 implements, inter alia, the features of the FIGS. 1A-1D and 2-3.

The keychain remoting system 400 includes a server credential manager 401.

The keychain remoting system 400 includes a server device having memory configured with the server credential manager 401. Example processing associated with the server credential manager 401 was presented above in detail with reference to the FIGS. 1A-1D and 3. The server credential manager 401 interacts with instances of mobile device credential managers (described above with reference to the FIGS. 1A-1D and the FIG. 2).

The server credential manager 401 is configured to manage and dynamically distribute asset credentials for remote assets that are remote from mobile devices by supplying tokens to keychain applications to reference the asset credentials on the mobile devices and when the asset credentials are needed dynamically providing the asset credentials to the mobile devices or to the remote assets on behalf of the mobile devices.

According to an embodiment, the server credential manager 401 is further configured to distribute mobile apps when registering the mobile devices; the mobile apps interact with the server credential manager and the keychain applications on the mobile devices. In an embodiment, the mobile apps are instances of the method 200 discussed above with reference to the FIG. 2.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   receiving from a mobile device a reference identifier and a credential along with a device token, the reference identifier for a service used by the mobile device;
   sending an asset token to the mobile device for use in authentication to the service, the asset token mapped to the reference identifier, the credential, and the device token; and
   directing the mobile device to store the asset token in connection with the service for access by the mobile device to obtain authenticated access to the service and processing the method as a remote keychain service for the mobile device for authenticated access to the service and other services accessible to the mobile device by subsequently receiving from the mobile device other reference identifiers and other credentials, each pair of the other reference identifiers and the other credentials maintained for authenticated access to a particular one of the other services, and providing a particular credential to the mobile device in response to a particular request from the mobile device having a particular reference identifier for the mobile device to gain authenticated access to a particular service.

2. The method of claim 1 further comprising, directing the mobile device to remove the credential from memory and storage of the mobile device.

3. The method of claim 1 further comprising, receiving from the mobile device he device token and the asset token, retrieving the credential for the mobile device to authenticate to the service, and sending the credential to the mobile device for authentication to the service.

4. The method of claim 3, wherein sending the credential further includes sending the credential to the mobile device in an encrypted format.

5. The method of claim 3, wherein receiving the device token and the asset token further includes generating an audit event indicating that the mobile device requested access to the credential.

6. The method of claim 1 further comprising, receiving from the mobile device the device token and the asset token, determining that the mobile device is reported as being lost or stolen and preventing the credential from being sent to the mobile device.

7. The method of claim 1, wherein receiving further includes receiving the credential in an encrypted format from the mobile device.

8. The method of claim 1, wherein receiving further includes receiving the credential with a user-name associated with the credential that authenticates to the service.

9. The method of claim 1, wherein sending further includes directing the mobile application to store the reference identifier for the service and the asset token in an operating system controlled keychain resident on the mobile device.

10. The method of claim 1, wherein sending further includes sending the asset token in an encrypted format to the mobile device.

\* \* \* \* \*

UNITED STATES PATENT AND TRADEMARK OFFICE
CERTIFICATE OF CORRECTION

PATENT NO. : 9,917,832 B2
APPLICATION NO. : 14/526243
DATED : March 13, 2018
INVENTOR(S) : Burch et al.

Page 1 of 1

It is certified that error appears in the above-identified patent and that said Letters Patent is hereby corrected as shown below:

In the Claims

In Column 10, Line 41, in Claim 3, delete "he" and insert --the-- therefor

Signed and Sealed this
Eighteenth Day of June, 2019

Andrei Iancu
*Director of the United States Patent and Trademark Office*